Sept. 23, 1958 H. KUMMERMAN 2,853,131

HATCH COVER

Filed Feb. 12, 1957 13 Sheets-Sheet 1

Sept. 23, 1958 H. KUMMERMAN 2,853,131

HATCH COVER

Filed Feb. 12, 1957 13 Sheets-Sheet 2

Sept. 23, 1958 H. KUMMERMAN 2,853,131

HATCH COVER

Filed Feb. 12, 1957 13 Sheets-Sheet 3

Sept. 23, 1958 H. KUMMERMAN 2,853,131

HATCH COVER

Filed Feb. 12, 1957 13 Sheets-Sheet 4

Sept. 23, 1958 H. KUMMERMAN 2,853,131

HATCH COVER

Filed Feb. 12, 1957 13 Sheets-Sheet 5

Sept. 23, 1958 H. KUMMERMAN 2,853,131

HATCH COVER

Filed Feb. 12, 1957

13 Sheets-Sheet 6

Sept. 23, 1958 H. KUMMERMAN 2,853,131

HATCH COVER

Filed Feb. 12, 1957 13 Sheets-Sheet 7

Sept. 23, 1958 H. KUMMERMAN 2,853,131

HATCH COVER

Filed Feb. 12, 1957 13 Sheets-Sheet 8

Sept. 23, 1958 H. KUMMERMAN 2,853,131

HATCH COVER

Filed Feb. 12, 1957 13 Sheets-Sheet 9

Sept. 23, 1958 H. KUMMERMAN 2,853,131

HATCH COVER

Filed Feb. 12, 1957 13 Sheets-Sheet 11

Sept. 23, 1958 H. KUMMERMAN 2,853,131

HATCH COVER

Filed Feb. 12, 1957 13 Sheets-Sheet 12

Sept. 23, 1958 H. KUMMERMAN 2,853,131

HATCH COVER

Filed Feb. 12, 1957 13 Sheets-Sheet 13

United States Patent Office 2,853,131 Patented Sept. 23, 1958

2,853,131

HATCH COVER

Henri Kummerman, Paris, France

Application February 12, 1957, Serial No. 639,672
Claims priority, application France April 13, 1956
13 Claims. (Cl. 160—188)

The present invention is concerned with an improved closing device intended for covering open spaces or vehicles, such as the hatchways of ship's holds, railway open-trucks and like applications.

The device of this invention is of the type comprising a series of separate panels simply associated or interconnected through links, chains or cables, controlled by one or two operating cables or chains connected to one of the panels only, and adapted to roll along the edges of the space to be covered so as to finally constitute a continuous sheet closing said space. When the space is open, these panels are stowed in a vertical position in a stowage place provided at one or either end of the aforesaid space. Each panel is provided with means such as rollers or skids whereby it can roll or slide along said edges of the space when the panel is disposed horizontally, these means co-acting with suitable ramps provided in the vicinity of the stowage place for tilting the panel from its horizontal to its vertical position and vice-versa.

It may be pointed out that these different operations, that is, the rolling of the panels along the edges of the space to be closed and their tilting from the horizontal to the vertical position and vice-versa, are obtained by pulling the aforesaid control chain. The number and size of the panels concerned are obviously subordinate on the one hand to the area of the space to be closed and on the other hand to the space available in the stowage place in which the panel assembly is to be stowed when the aforesaid open space is being opened.

The essential requirement, for the present, of a device of this character is to permit a rapid and safe operation. In other words, any shocks and jerks must be avoided during the actuation of the panels, and besides these should not tip up inopportunely so as to escape from the operator's control. Moreover, when the space is opened by causing the panels to tip up from the horizontal to the vertical position, a thrust is exerted by the remotest panel from the stowage place on the adjacent panel. Consequently care should be taken that no jamming or distortion of the panels with respect to one another occurs.

Now the device constituting the subject-matter of this invention is adapted to meet all the requirements concerning the rapidity and safety of operation and is remarkable notably in that the runway provided along the edges of the space to be covered is formed with an extension inside the stowage place or places, this extension being bent or curved downwards and co-acting with the aforesaid rollers; furthermore, mechanical means are provided for urging and keeping said rollers in engagement with said curved portion until the tipping operation is completed.

According to another feature of this invention, the aforesaid mechanical means consists of grooves adapted to receive said rollers, or spaced, substantially parallel ramps constituting a channel, etc.

According to a further feature of this invention, as the different panels exert a thrust against one another during their rolling and tilting movements, a plurality of so-called thrust rollers or like members are provided on each panel (except the one nearest to the stowage place) and on the panel end nearest to the stowage place, said rollers projecting slightly from the contour of the panels and ensuring the contact between the panel on which they are mounted and the adjacent panel, whereby only one pair of rolling rollers are provided on each panel, except on the panel remotest from the stowage place.

Other features and advantages of the present invention will appear as the following description proceeds with reference to the accompanying drawings forming part of this specification and illustrating diagrammatically by way of example a few typical embodiments of the invention. In the drawings.

Figure 1:
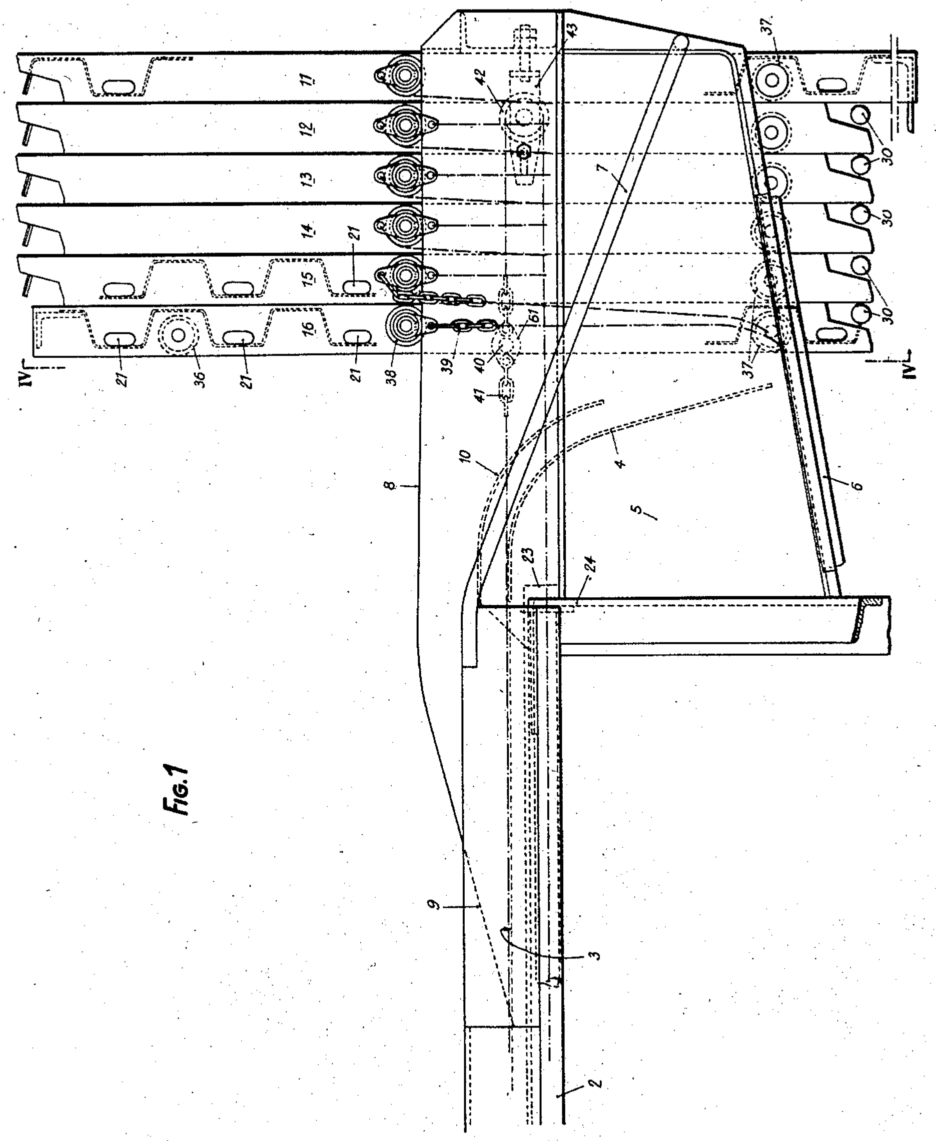
Figure 1 is a side elevational view showing a closing device constructed in accordance with the teachings of this invention, wherein the different panels are disposed in their stowage place.
Figure 2:
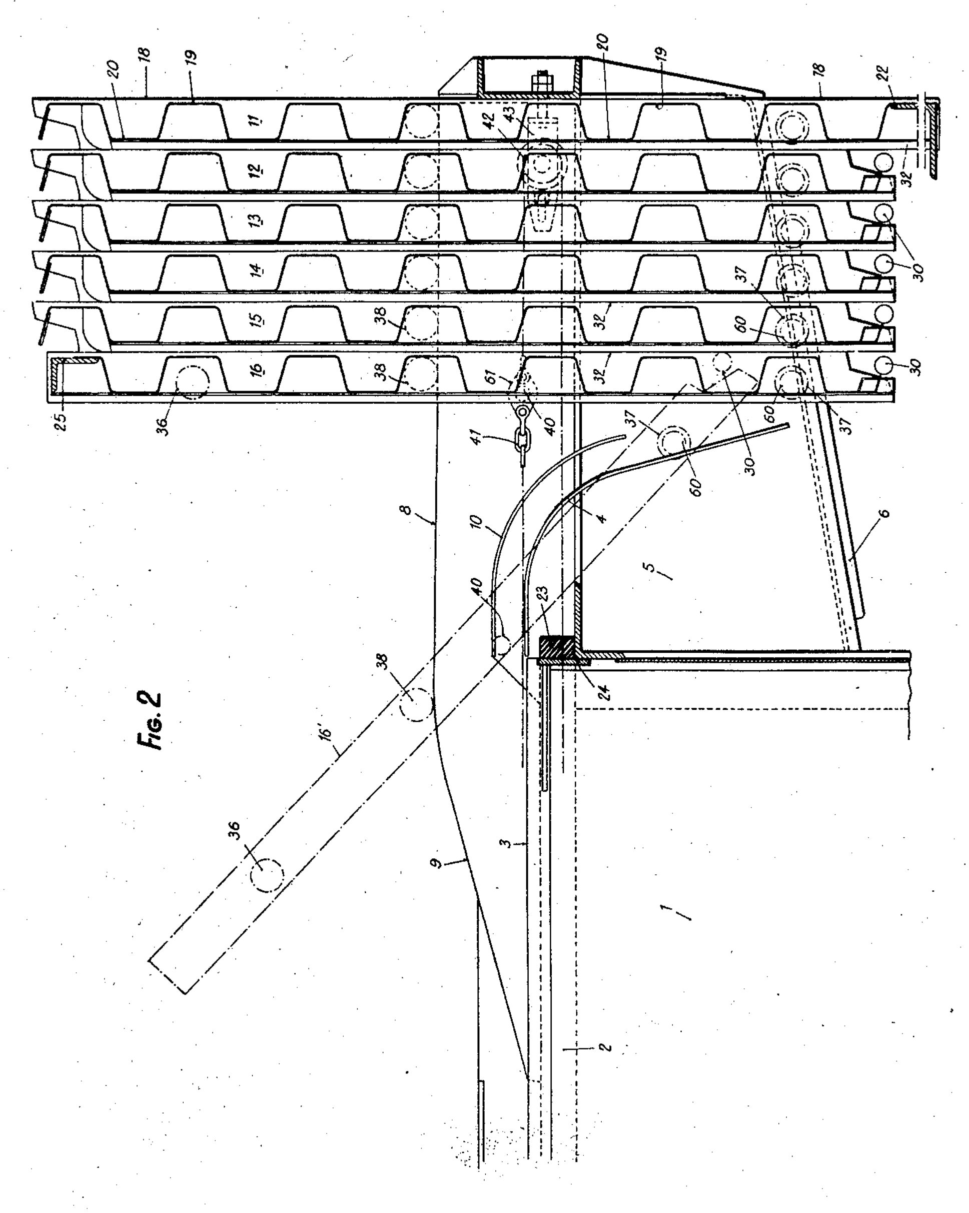
Figure 2 is a longitudinal section corresponding to Fig. 1.
Figure 3:
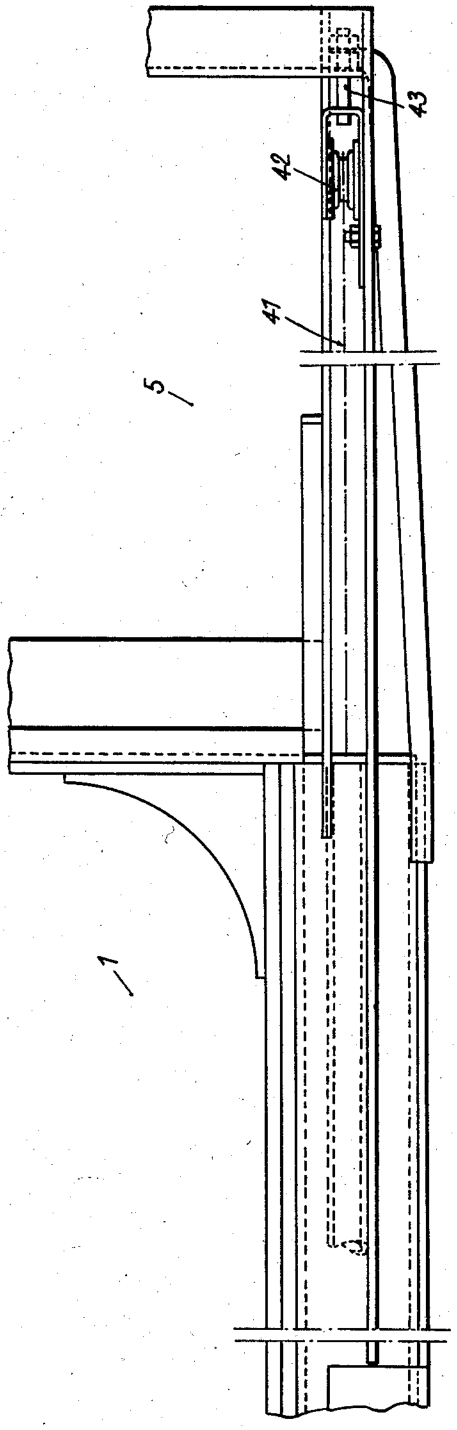
Figure 3 is a plane view corresponding to Fig. 1.

In the example illustrated in Figs. 1 and 2 of the drawings, the space to be closed by means of the device of this invention is designated in general by the reference numeral 1. At its upper portion this space comprises an edge 2 carrying a runway 3 having an inclined and curved extension 4. It will be readily understood that the space 1 may belong to or constitute a ship's hold, a railway open truck, etc. Whatever the field of application of this invention, the function of the device constituting the subject-matter thereof will remain the same, i. e. covering or closing an open space.

There is shown in Figs. 1 and 2 a secondary place or recess 5 called herein stowage place which is adjacent to the space 1 and consists for example of a frame structure shown more or less diagrammatically at 6 with reinforcing members 7. On its sides the stowage space 5 is lined with sections or like elements 8 forming guideways flanking said storage space ending towards the space 1 with an inclined portion or ramp 9.

As already set forth hereinabove, the inclined portion 4 constituting the extension of the runway 3 extends inside the stowage place 5 as shown on the other hand in Figs. 1 and 2.

According to this invention an additional inclined guideway element 10 substantially parallel to the ramp 4 is provided and adapted to constitute therewith a kind of channel for a purpose to be defined presently. The main point is that it forms a channel in which, as will be explained presently, rollers or shafts mounted on the panels may be engaged.

As illustrated in Fig. 1, the space 1 is closed by means of a series of panels illustrated at 11, 12, 13, 14, 15 and 16. In the example illustrated six panels are provided, but it will be readily understood that this number is arbitrary as far as the principle of this invention is concerned. The panel 11 is the nearest to the stowage place 5 and the panel 16 is the remotest therefrom, as will be readily understood. These panels may be of any desired and suitable type, of course, but an embodiment particularly adequate and advantageous is illustrated in Figs. 5 to 8 of the drawings. In this specific form of embodiment the panels consist of a pair of lateral flat bar-irons 17, 18 constituting the frame of the panel. Between these flat bar-irons a corrugated or pressed sheet-iron is disposed, this sheet having for example a section comprising a swell 19 and a trough 20. This specific panel design is advantageous in that it combines a considerable strength with an appreciable lightness. In the troughs 20 ports or scupper-holes 21 are provided at spaced intervals for draining any rainwater likely to accumulate in these panel portions.

Regarding the construction of the panel ends, a discrimination should be made between the end panels, i. e. the panels 11 and 16, and the intermediate panels 12, 13, 14 and 15.

Regarding the end panels 11 it is necessary to contemplate on the one hand the manner in which it will be connected to the adjacent panel 12 in the closed position, and on the other hand the manner in which it will provide a water-tight joint with the edge of the space to be closed. If reference is made to Fig. 12 of the drawing it will be seen that for this purpose the panel concerned may comprise, for example, an angle member 22 of which one wing is adapted to engage through the medium of a suitable sealing material, for example a rubber strip 23, the end edge 24 of the stowage place 5.

Figures 6, 7, 8, 12:
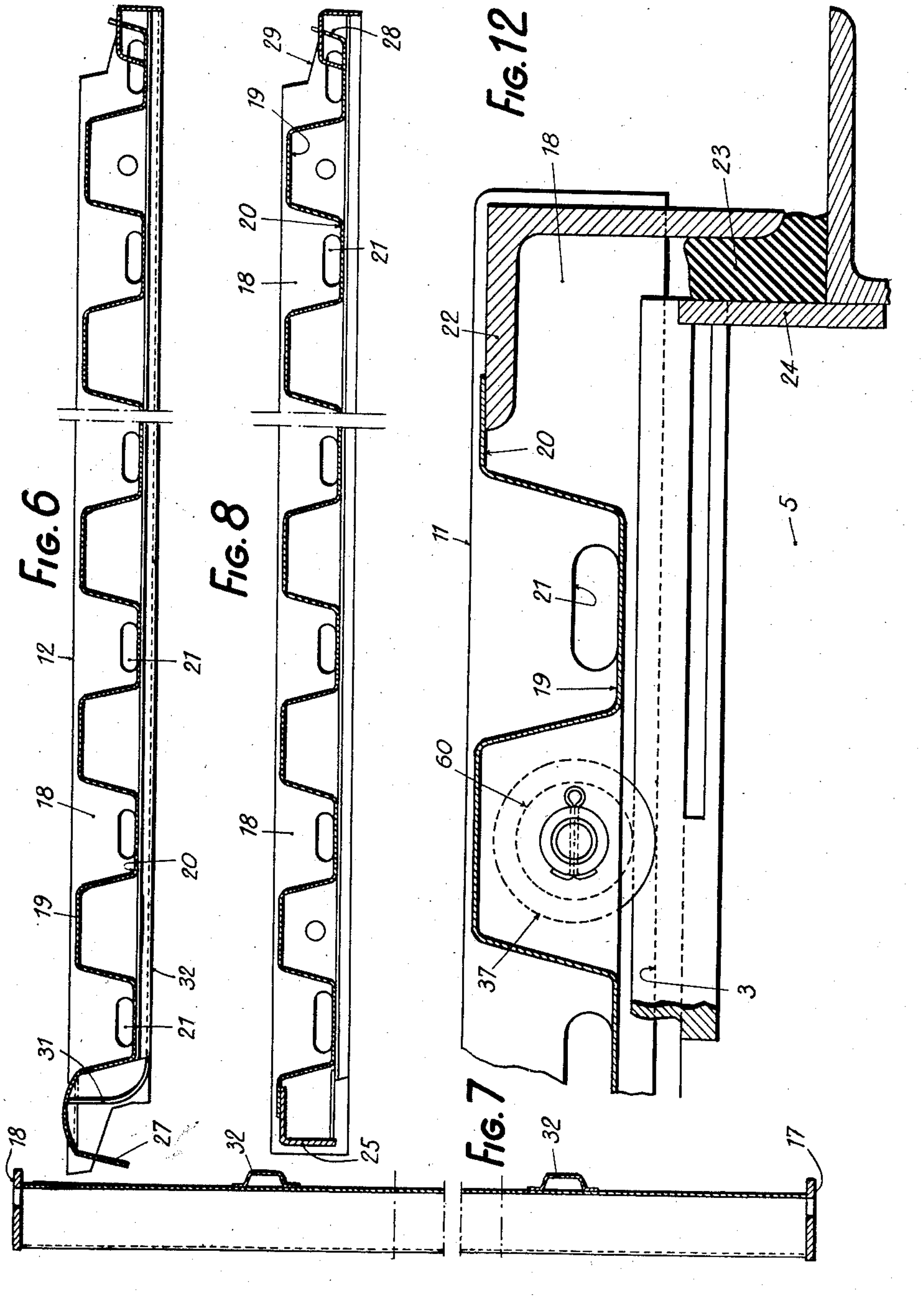
Figure 6 is a section taken upon the line VI—VI of Fig. 5.
Figure 7 is another section taken upon the line VII—VII of Fig. 5.
Figure 8 is a section similar to Fig. 6 but showing a so-called end panel, in this case the panel remotest from the stowage place.
Figure 12 is a cross-sectional view showing the joint between the panel nearest to the stowage place and the edges of the space to be closed.
Figures 10, 11:
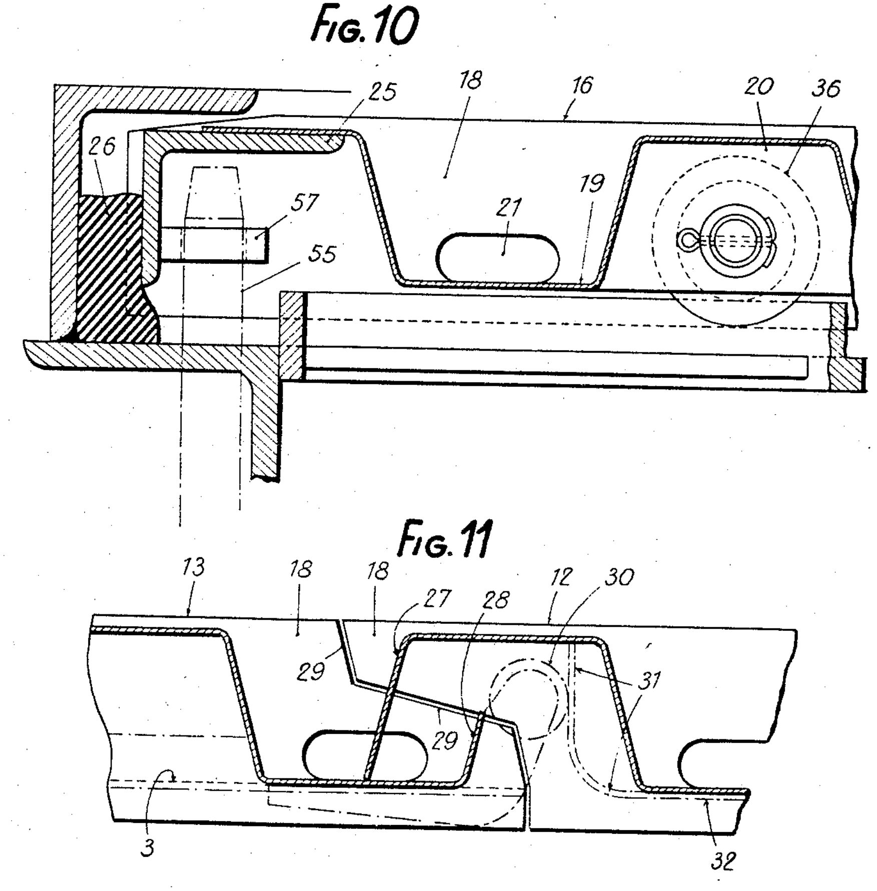
Figure 10 is a cross section showing the end joints of the panel remotest from the stowage place.
Figure 11 is a view showing on a larger scale the joint between two adjacent panels.

The same applies to the end panel 16 as illustrated in Figs. 8 and 10. In this case the end of the panel is provided with an angle or section iron 25 adapted to engage the edge of the space 1, a suitable sealing joint 26, exactly as in the case of panel 11, being interposed therebetween.

Regarding the intermediate panels, the manner in which they are mounted is clearly shown in Figs. 6 and 11. The sheet-iron member 19, 20 constituting the panel proper comprises a bent projection 27 at one end of the panel 12, for example as illustrated in Fig. 6. The same occurs in the adjacent panel 13, for example, in which the bent projection 28 has its outer edge turned upwards instead of downwards in the case of the projection 27. The reinforcement of frames 17, 18 are formed in turn with a cut-out portion 29 of broken-line configuration, for example, in order to provide a suitable interfitting joint between the adjacent ends of the two panels.

Each intermediate panel 12, 13, 14 and 15, for example, and the end panel 16, carry at their ends nearest to the stowage place 5 a so-called thrust roller 30. When the panels are in their extended or space-closing position, each roller 30 co-acts with an engages a boss and ramp-forming element 31 provided on the adjacent panels and merging in a member 32 provided on the lower face of this last-mentioned panel. This member 32 may be of channel configuration and constitutes a runway for said roller 30, the ramp or boss 31 serving the purpose of guiding the initial portion of the thrust movement as will be made clear presently.

Figure 13:
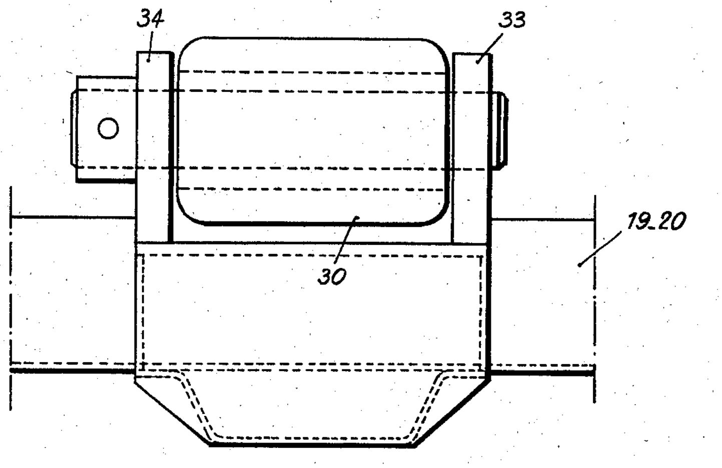
Figure 13 is a detail view illustrating the mounting of a so-called thrust roller.

Figure 13 illustrates a specific mounting of this roller 30. In this embodiment, the roller is mounted by means of two bearing-forming members 33, 34 secured on the sheet-iron 19, 20. As a rule, two rollers are provided in the vicinity of the stowage space, this being quite sufficient to ensure a satisfactory operation of the device of the invention.

Figure 5:
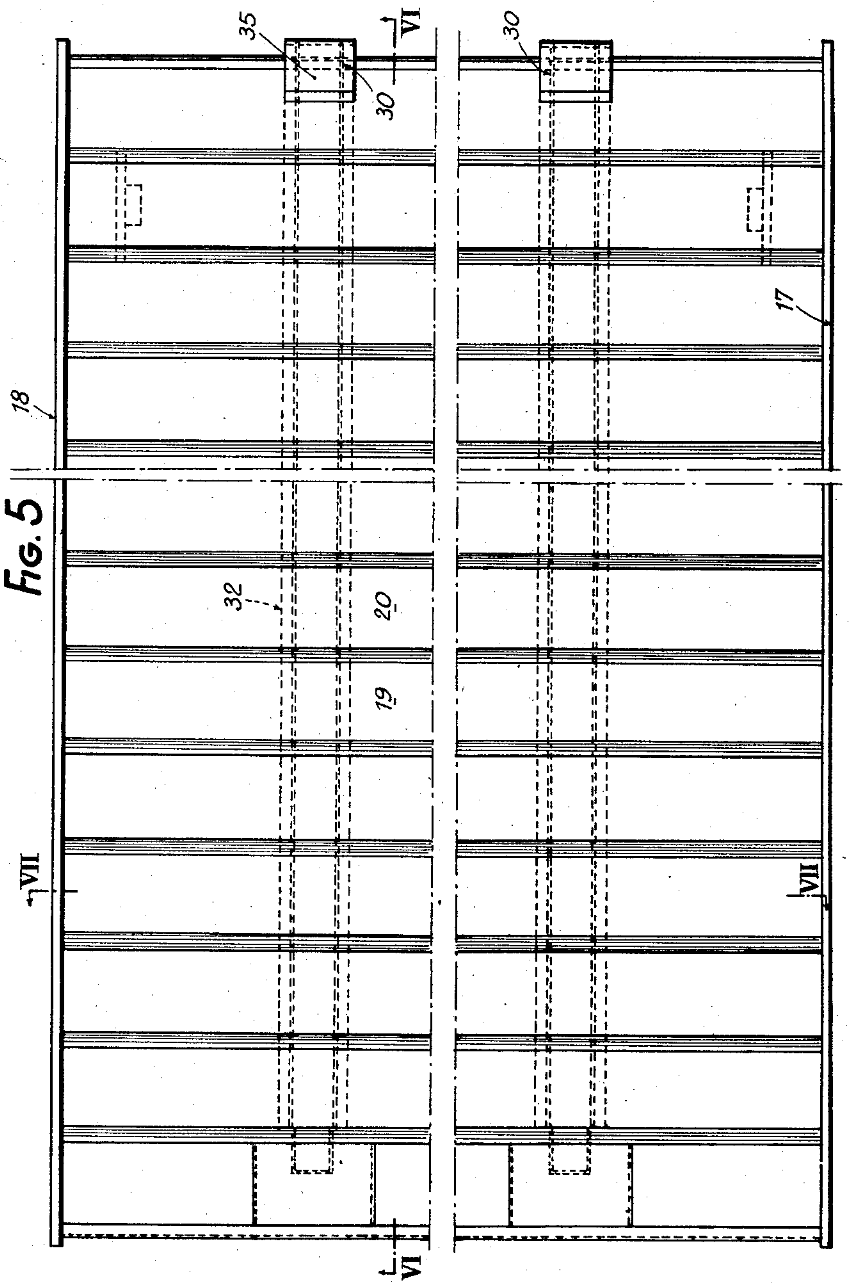
Figure 5 is a plane view of a panel according to the invention.

The runway 32 illustrated in Fig. 11 is also shown in Figs. 5 and 7, it consists, in this specific example, of a channel iron projecting from the lower face of the panel, but it will be readily understood that any other suitable section, even a hollow section, may be used for this purpose, provided that it is adapted to be engaged by the thrust roller 30 of which the position 35 is illustrated in Fig. 5.

The movement of the panels 11 to 15 is obtained by riding means consisting for example of a pair of so-called supporting rollers 37 and also by tilting means consisting for example of so-called tipping rollers 38. To this end, the rollers 37 are movable along the runway or guide race 3 and then on the ramp 4. On the other hand, the tipping roller 38 is movable firstly along the ramp 9 and then along the rectilinear runway 8 disposed alongside the stowage place 5.

In its closed or rolling position, each panel 11 to 15 is maintained in equilibrium by the supporting rollers 37 and the thrust rollers 30 of the adjacent panel. Only the end panel 16 which does not engage any roller 30 is provided with two pairs of rollers 36 and 37.

Of course, paired rollers 36 and 37 may be provided on all the panels 11 to 16 without departing from the spirit and scope of the invention.

The different panels are interconnected through flexible connecting means such as chains or cables 39 attached for example to the shafts of rollers 38. Of course, any other fixation point may be used, if desired. The length of these chains 39 should be calculated as a function of the length of the panels so as to permit their proper spreading in the space-closing position.

The remotest panel 16 is connected at a point 40 to a control chain or cable 41 which, in the example illustrated, is of the endless type. For this purpose, a return sprocket or notched pulley 42 mounted on a tensioning device 43 may be provided, as shown. Preferably, this assembly is disposed sidewise to the runway 3. Of course, the arrangement may comprise, if desired, two cables on either side of the space 1 to be closed, so as to distribute the stress symmetrically.

Figure 9:
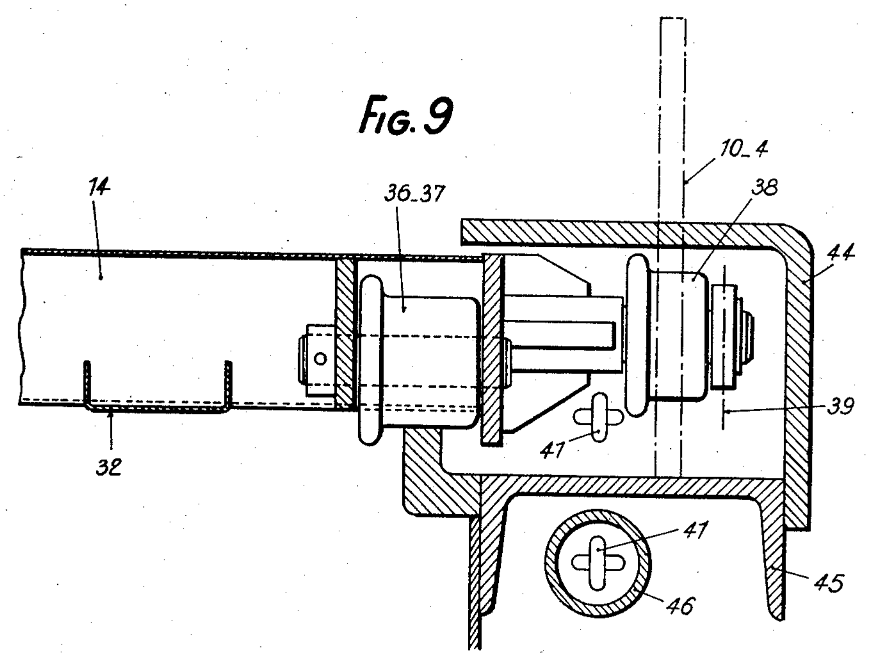
Figure 9 shows in horizontal section a fragmentary view of the runway provided along the edges of the space to be closed.

In the example illustrated it is assumed that the assembly comprises only one stowage place and that the panel assembly designed to cover the space 1 could be stowed completely therein. Under these conditions, the device for actuating the control cable or chain 41 may be located at the opposite end of the space 1. Moreover it is assumed in this embodiment that the space 1 to be closed was a railway open-truck. Figs. 14 to 18 show clearly the general disposition of this assembly. It is essential to point out primarily that, as illustrated in Fig. 9, the chain and the rollers are protected laterally by the provision of a section iron 44 welded or otherwise secured on the upper edge 45 of the space 1 to be closed. The section iron 44 constitutes a kind of channel engageable by the various rollers mounted on the panels and also by the control chain 41. The return reach of this chain may be positioned if desired outside the channel in a special sheath or in a tube 46 as also shown in Fig. 9.

In the case of a railway truck, it is necessary that the complete device may be actuated from the ground.

As already set forth hereinabove, the control chain or cable 41 passes over a sprocket or notched pulley 42 and leads to the other end of the truck or space 1 where it is wound up on a toothed wheel 47. This toothed wheel is mounted coaxially to a pinion 48 meshing for example with another pinion 49 coaxial with a chain wheel 50 over which a control chain 51 is passed, this chain 51 being adapted to be pulled by hand and guided at its lower portion by a grooved pulley 52.

A modified embodiment may comprise a notched wheel substituted for the groove pulley 52 and provided with a shaft 53 actuated by a crank or like member located at a convenient level so that the operator may actuate it from the ground. With this arrangement an extremely simple and convenient control device is obtained, and due to the gear reduction provided by the gear assembly 47, 48, 49 and 50, the effort required for its actuation is reduced considerably so that the panel spreading movement takes place very rapidly and without any substantial effort for the operator.

Of course, the device may be constructed in a similar but slightly different manner by simply passing the chain 41 over a notched wheel such as 47 and causing this chain to lead to a pinion such as 52. In this case, the chains 51 and 41 will be combined into a single one, but, of course, the effort imposed on the operator would be much more considerable.

In the embodiment illustrated by way of example the same chain control device is provided on either side of the truck and the chain wheels 50 are interconnected through a transverse shaft 62 for balancing the stresses on both control chains 41. Thus, the device may be actuated either simultaneously by pulling both chains 51, or by a single operator placed on one or the other side of the truck, so that it is not necessary for him to cross the track.

Figure 16:
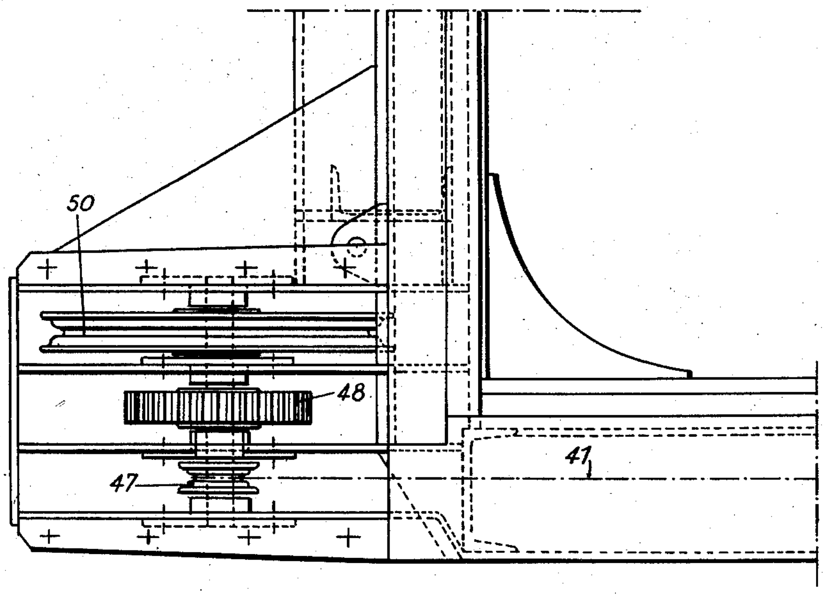
Figure 16 is a corresponding plane view.
Figure 14:
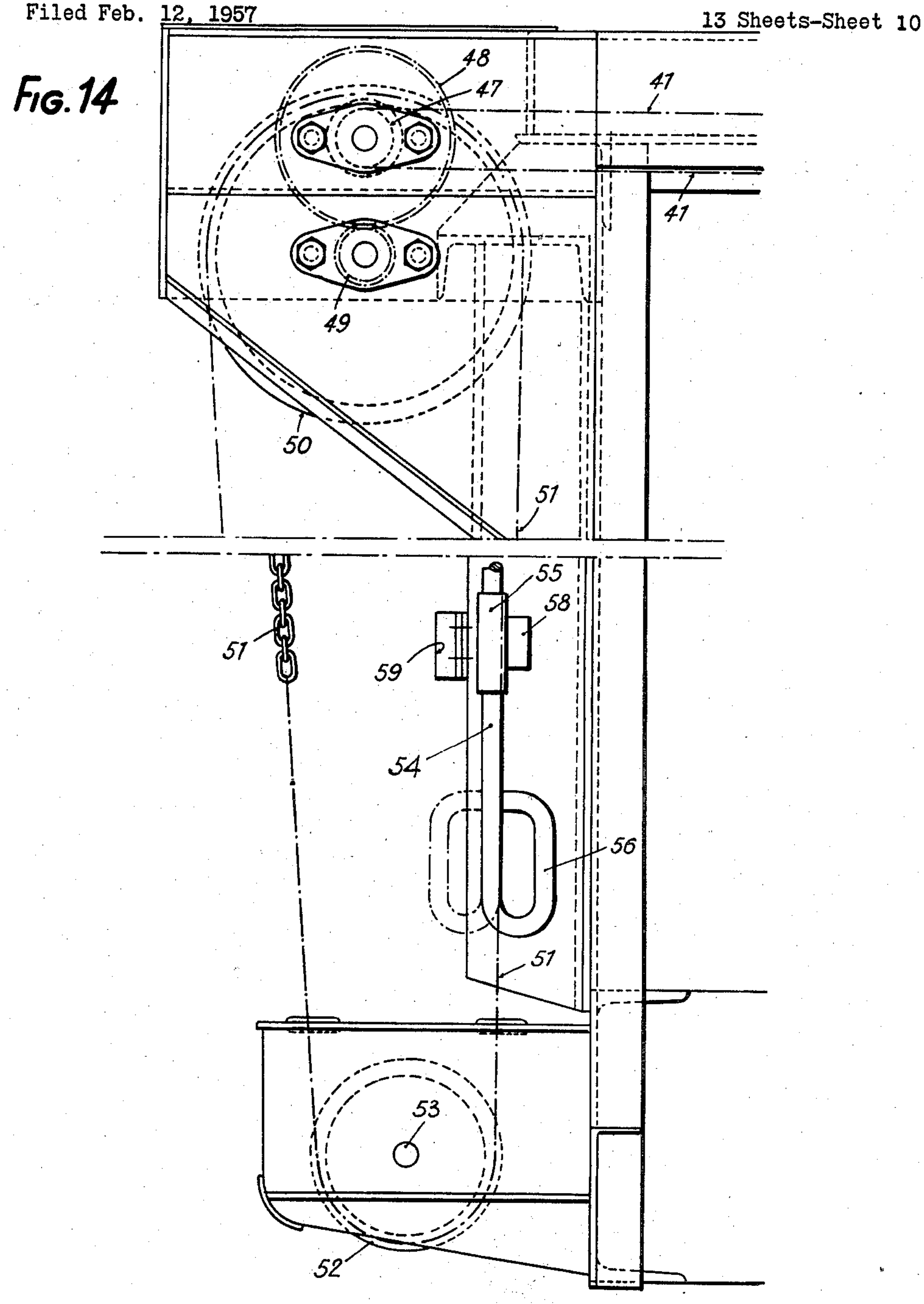
Figure 14 is an elevational view showing the device for controlling the operating cable or chain.
Figure 15:
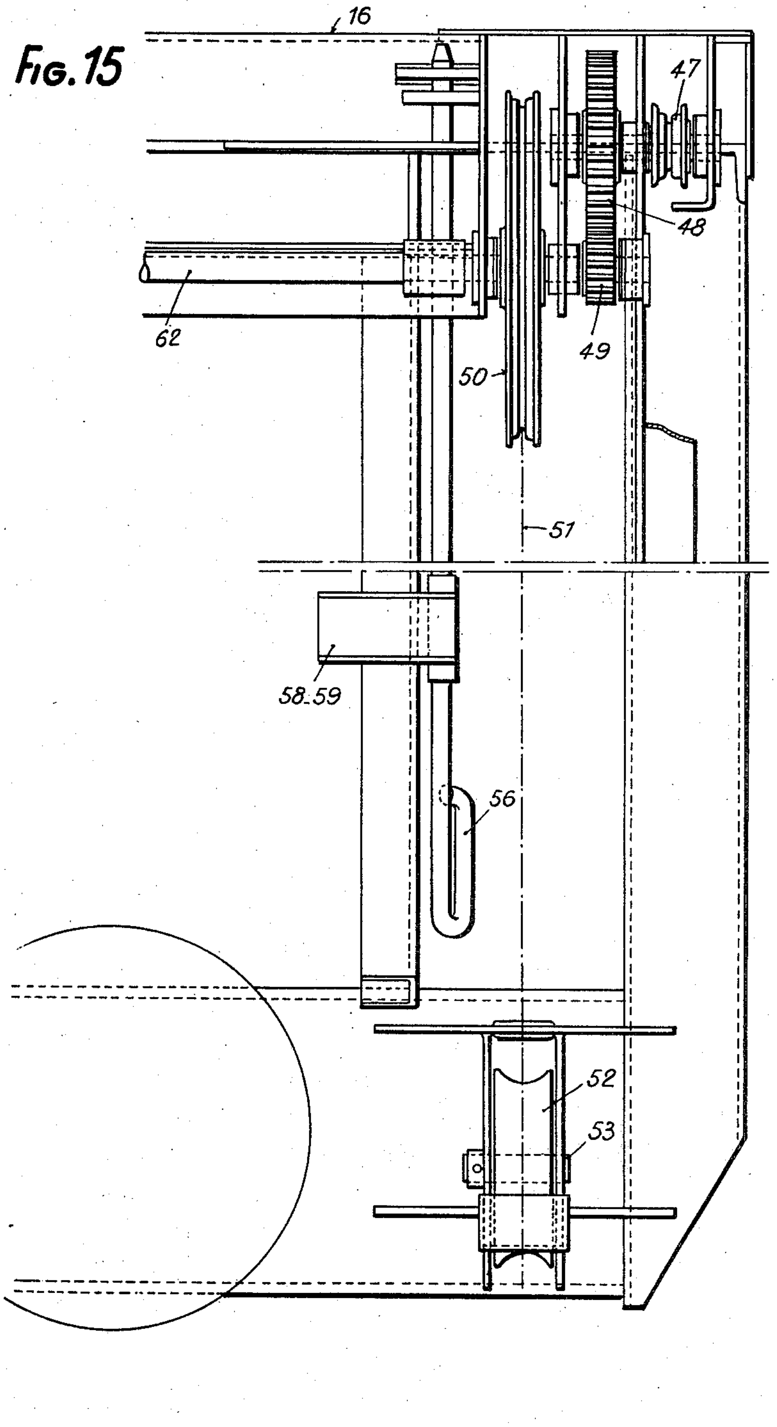
Figure 15 is a corresponding end view.
Figure 18:
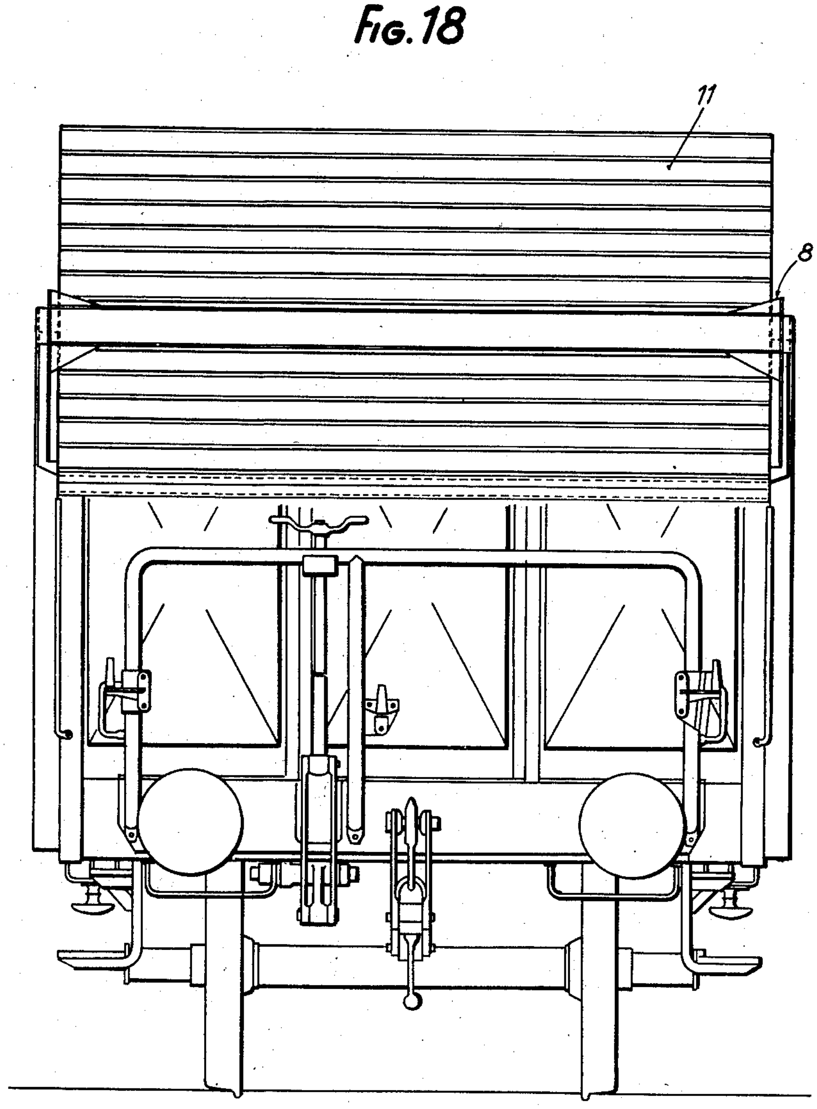
Figure 18 is an end view of the truck shown in Fig. 17.

In Figs. 14 to 16 of the drawings, and also in Fig. 18, a control rod 54 guided for example in a socket 55 and adapted to be controlled from the ground is shown. The purpose of this rod is to lock the end panel 16 when it has attained its closed position. To this end, the rod 54 is provided or formed with a handle 56 (see Figs. 14 and 15) and its upper end is adapted to engage a notch or orifice formed for example in a member 57 located inside the panel 16 and secured on the end angle-member of this panel as illustrated at 25. With this rod or bolt 55 it is possible to lock the panel in the desired position, and by rotating the handle 56 to the position in which it is shown in chain-dotted lines in Fig. 14 it is possible to cause a projection 58 carried by this rod to engage an appropriate recess 59 formed in the frame or body structure of the truck or the like.

For the sake of symmetry, this locking device may be provided on either side of the truck. Thus, this device may be used for affixing the custom seals.

Of course, a similar locking device may be provided on each panel.

Figure 4:
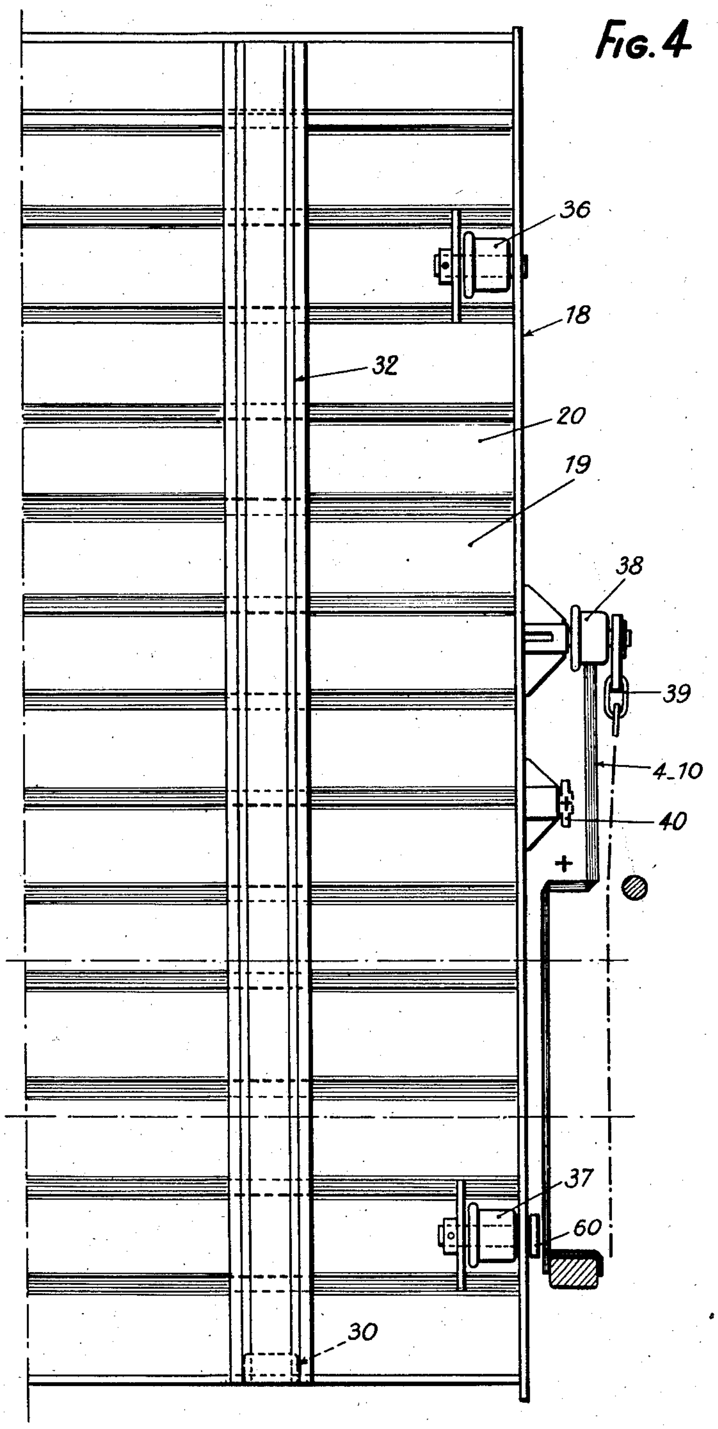
Figure 4 is a section taken upon the line IV—IV of Fig. 1.

In order to facilitate the guiding and tipping movements of the panels as they pass from the horizontal position to the vertical position and vice-versa, a so-called stowing roller 60 carried by the same shaft as the roller 37 may be provided, as illustrated in Fig. 4. Thus this roller 60 will be guided between the pair of inclined ramps 4 and 10 illustrated in Fig. 1.

The operation of the arrangement described hereinabove is extremely simple. Referring to Figs. 1 and 2 of the drawings, it will be seen that when the control cable or chain 41 is pulled to the left the panel 16 is also moved to the left, and at a certain moment the stowing roller 60 will engage the inclined ramp 4. At the same time, the so-called tipping rollers 38 move along the runway 8 so that the panel 16 attains the position shown in chain-dotted lines at 16′, Fig. 2. As this movement is continued, the rollers 60 and 38 move along the ramps 4—10 and 8—9, thereby causing the panel to tilt and assume a definitive horizontal position on the edges of the space to be closed. During this movement, the panel is guided on the one hand by its roller 60 moving in the gap provided between the two ramps 4 and 10, and on the other hand by the so-called thrust roller 30 engaging the runway 32 provided on the adjacent panel and, finally, by a roller 38 engaging the ramp 8—9. Thus, it is apparent that the panel will be tilted very progressively as it is guided at three separate locations. Therefore, it is not possible for the panel to effect any untimely or undesired movement until it attains the horizontal position. The same applies to the different successive panels, all of which are tipped in the same manner and occupy a horizontal position to close the space 1. When it is desired to open this space, the panels are moved in the opposite direction by exerting a pull on the chains in the corresponding direction, i. e. to the right as seen in the figures, whereby the panels 11, 12, 13, 14, 15 and 16 will be successively brought in positions such as illustrated at 16′; during these movements they keep exerting a forward thrust by virtue of the roller 30 engaging the adjacent panel so that the panels are pushed and forced into engagement on the one hand with the runway 8—9 and on the other hand with the ramps 4—10.

Figure 17:
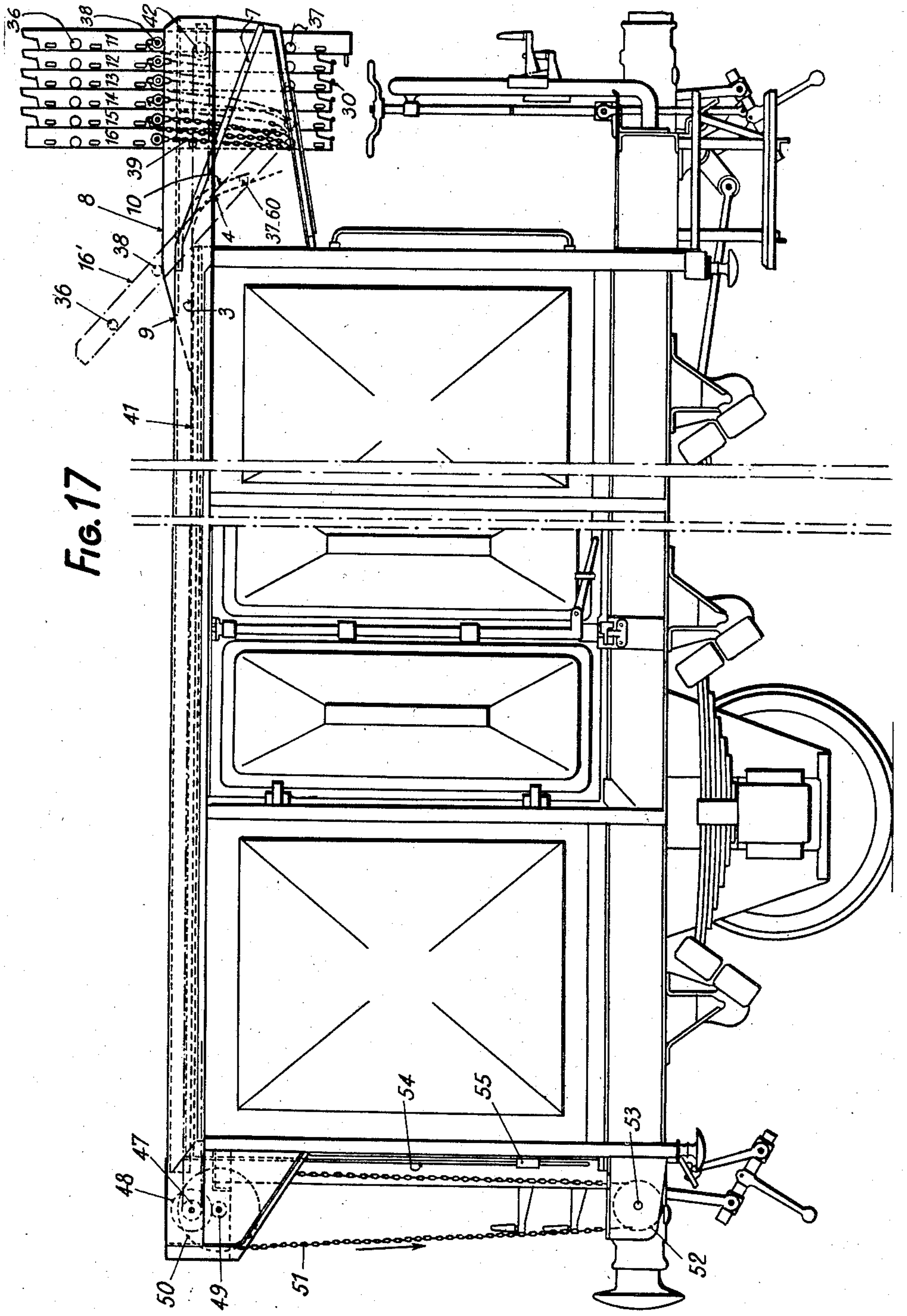
Figure 17 is a side elevational view showing a railway truck provided with a device according to this invention.

In Figs. 17 and 18 there is illustrated the specific case of a railway open-truck on which the stowage space is provided at one end of the truck only, above the coupling-buffers. It is evident that the number and size of the panels vary as a function of the dimensions of the stowage place available. Of course, the panels may be divided into two groups and stowed at both ends of the truck, the junction between these groups occurring in the middle of the truck. However, considering the nature of the panels utilized in this construction and more particularly their control device and the very reduced space required for stowing them, the embodiment shown in Figs. 17 and 18 is preferred, as demonstrated by practical experiments.

Moreover, it is also possible to use in the device of this invention panel-actuating means other than the endless chain or cable illustrated in the drawings at 41. It is also worth pointing out that in the different figures of the drawings a so-called traction member 61 secured on the end panel 16 and connected to the chain 41 is illustrated. It is evident that any desired and convenient modifications may be brought to this mounting without departing from the spirit and scope of the invention.

Of course, the overlapping of the panels relative to one another and to the body or structure to be covered will comprise means such as baffles, channels or draining apertures for sealing and discharging the rainwater.

Finally, it will be readily understood by anybody conversant with the art that the invention is not limited to the typical embodiments illustrated and described herein, as many modifications may be brought thereto without departing from the spirit and scope of the invention as set forth in the appended claims.

What I claim is:

1. A closing device for a hold comprising back, front and side walls, said walls defining an opening comprising a series of separate panels, runways flanking said opening, riding means on said panels allowing them to ride on said runways to close and open said opening, a storage space at least at one end of said opening for locating said panels in an upended position and in adjacent relationship, guideways flanking said storage space and laterally offset with respect to the said runways, downwardly inclined extensions on said runways located inside said storage space, said riding means being adapted to ride on said inclined extensions, tilting means extending laterally of each of said panels and intended for cooperation with said guideway flanking said storage space, flexible connecting means between two adjacent panels, control means acting on the panel which is the remotest with respect to said storage space for causing all of the said panels to be tilted and moved into and out of the said storage space in order to close and open said opening, an additional inclined guideway element in said storage space vertically offset from and at least partially superimposed in parallel relationship to said inclined extension constituting a channel like guideway therebetween for obtaining a secure guiding of said tilting means, and further thrust roller means on every panel except the panel nearest the said storage space, said thrust rollers projecting from the contour of their respective panels and being provided on the ends of said panels nearest the storage space, the panels being considered occupying their horizontal closing position, whereby during the tilting operation the said thrust rollers of one panel contact the lower surface of the adjacent panel and contribute thereby to support the corresponding end of the second adjacent panel and also transmit thereto the exerted thrust.

2. A closing device for a hold comprising back, front and side walls, said walls defining an opening, comprising a series of separate panels, runways flanking said opening, riding means on said panels allowing them to ride on said runways to close and open said opening, a storage space at least at one end of said opening for locating said panels in an upended position and in adjacent relationship, guideways flanking said storage space and laterally offset with respect to the said runways, downwardly inclined extensions on said runways located inside storage space, said riding means being adapted to ride on said inclined extensions, tilting means extending laterally of each of said panels and intended for cooperation with said guideway flanking said storage space, flexible connecting means between two adjacent panels, control means acting on the panel which is the remotest with respect to said storage space for causing all of the said panels to be tilted and moved into and out of the said storage space in order to close and open said opening, an additional inclined guideway element in said storage space vertically offset from and at least partially superimposed in parallel relationship to said inclined extension constituting a channel like guideway therebetween for obtaining a secure guiding of said tilting means, and further thrust roller means on either panel except the panel nearest the said storage space, said thrust rollers projecting somewhat from the contour of their respective panels and being provided on the ends of said panels nearest the storage space, the panels being considered occupying their horizontal closing position, whereby during the tilting operation the said thrust rollers of one panel contact the lower surface of the adjacent panel and contribute thereby to support the corresponding end of the said adjacent panel and also transmit thereto the exerted thrusts, whereas the aforesaid riding means consist of but a single pair of rollers provided only on one end of the said panels.

3. A device according to claim 1 wherein ramp forming elements are provided on the lower face of said panels, considered in their horizontal closing position, for a guiding cooperation with the thrust rollers of an adjacent panel.

4. A device according to claim 3 wherein said ramp forming means consist of channel means secured to the said lower face of the panels.

5. A device according to claim 1 wherein protection means are provided for said laterally extending control means.

6. A device according to claim 1 wherein a protective channel member is secured on the edges of said opening for containing and protecting outwardly at least partially the said tilting and riding means and the control means.

7. A device according to claim 1 wherein the different panels are made of corrugated sheet iron and comprise a reinforcing external frame.

8. A device according to claim 7 wherein said frame consists of two lateral flat-irons.

9. A device according to claim 1 wherein means are provided for locking said panels in their closing position, said means comprising rod means controlled from the ground level, handle means on said rod, hook like means at one end of said rod and notch like means on one of said panels, said hook engaging said notch for locking the panel.

10. A device according to claim 7 wherein interfitting elements are provided on each one of two adjacent panels and are adapted to overlap forming thereby a joint when the panels occupy their closing position.

11. A device according to claim 4 wherein said channel means are provided with a curved end portion intended to damp the shocks produced by the thrust rollers of the different panels.

12. A device according to claim 7 wherein draining means for rain water are provided in the body of the different panels.

13. A device according to claim 1 wherein said riding means consist of rollers whereas further rollers are provided coaxially with said riding rollers and are intended to roll on said inclined extensions.

References Cited in the file of this patent

UNITED STATES PATENTS

| | | |
|---|---|---|
| 2,641,214 | MacGregor et al. | June 9, 1953 |
| 2,771,136 | Lecomte | Nov. 20, 1956 |

FOREIGN PATENTS

| | | |
|---|---|---|
| 695,657 | Great Britain | Aug. 12, 1953 |